United States Patent
Bludworth (10) Patent No.: US 7,252,295 B2
(45) Date of Patent: Aug. 7, 2007

(54) HOUSEHOLD AND SHOPPING LAUNDRY CART

(76) Inventor: Aaron Bludworth, 2922 Wickersham La., Austin, TX (US) 78741

( * ) Notice: Subject to any disclaimer, the term of this patent is extended or adjusted under 35 U.S.C. 154(b) by 233 days.

(21) Appl. No.: 10/897,740

(22) Filed: Jul. 23, 2004

(65) Prior Publication Data
US 2006/0017243 A1    Jan. 26, 2006

(51) Int. Cl.
B62B 1/12 (2006.01)
(52) U.S. Cl. .............................. 280/33.991; 280/47.26
(58) Field of Classification Search ........... 280/33.991, 280/47.26, 79.2, 47.31, 47.34
See application file for complete search history.

(56) References Cited

U.S. PATENT DOCUMENTS

| | | | | |
|---|---|---|---|---|
| 4,511,154 A | * | 4/1985 | Daloisio .................. | 280/47.26 |
| 4,873,841 A | * | 10/1989 | Bradshaw et al. ............ | 62/239 |
| 5,249,438 A | * | 10/1993 | Rhaney et al. .............. | 62/457.7 |
| 5,269,157 A | * | 12/1993 | Ciminelli et al. ........... | 62/457.7 |
| 5,318,315 A | * | 6/1994 | White et al. .............. | 280/47.26 |
| 5,480,170 A | * | 1/1996 | Kaiser, II .................... | 280/30 |
| 5,683,097 A | * | 11/1997 | Fenton et al. ............ | 280/655.1 |
| 5,692,761 A | * | 12/1997 | Havlovitz ............... | 280/33.994 |
| 5,803,472 A | * | 9/1998 | Lien ........................ | 280/47.26 |
| 6,036,204 A | * | 3/2000 | Craft et al. ............ | 280/47.315 |
| 6,176,499 B1 | * | 1/2001 | Conrado et al. .......... | 280/47.26 |
| 6,193,265 B1 | * | 2/2001 | Yemini ........................ | 280/653 |
| D440,020 S | * | 4/2001 | Ronson et al. ............... | D32/37 |
| 6,213,482 B1 | * | 4/2001 | Yemini .................... | 280/47.26 |
| 6,311,991 B1 | * | 11/2001 | Conrado et al. ......... | 280/47.26 |
| 6,315,149 B1 | * | 11/2001 | Conrado et al. ............ | 220/521 |
| 6,328,179 B1 | * | 12/2001 | Conrado et al. .......... | 220/592.2 |
| 6,364,329 B1 | * | 4/2002 | Holub et al. ............. | 280/47.26 |
| 6,446,988 B1 | * | 9/2002 | Kho ........................ | 280/47.26 |
| 6,474,097 B2 | * | 11/2002 | Treppedi et al. ........... | 62/457.7 |
| 6,561,529 B2 | * | 5/2003 | Darling, III ................. | 280/79.2 |
| D486,619 S | * | 2/2004 | Rivera et al. ................ | D34/19 |
| 6,755,428 B2 | * | 6/2004 | Butler ...................... | 280/47.26 |
| D497,290 S | * | 10/2004 | Porshia ....................... | D7/605 |
| 2005/0275174 A1 | * | 12/2005 | Mullen et al. .......... | 280/47.26 |
| 2006/0103087 A1 | * | 5/2006 | Alcala Sebastian ...... | 280/47.26 |
| 2006/0208439 A1 | * | 9/2006 | Depasquale et al. ..... | 280/47.17 |

* cited by examiner

*Primary Examiner*—Jeff Restifo
(74) *Attorney, Agent, or Firm*—Derek R. Van Gilder (57) ABSTRACT

A household and shopping laundry cart has a cart basket (1) with a first-side wheel (7) and a second-side wheel (8) that are positioned on sides aft of a linear center. A tow handle (10) is pivotal vertically on a tow hitch (11) on a front-end wall (4). A stair-climber incline (14) is extended slantingly downward and rearward from near a front of a bottom (6) of the cart basket to the wheels. A front support (15) proximate a front-bottom edge holds the cart basket level when stopped on a horizontal surface and aids in stair climbing. A basket cover (13) is extendable from a first top side (53) to a second top side (56). Side walls of the basket are tapered inwardly from-top-to-bottom for telescopic storage of a plurality of the household and shopping laundry carts.

16 Claims, 6 Drawing Sheets

HOUSEHOLD AND SHOPPING LAUNDRY CART

BACKGROUND OF THE INVENTION

1. Field of the Invention

This invention relates to laundry carts that can be used as household carts, shopping carts, laundry baskets and baby carriages.

2. Relation to Prior Art

Numerous laundry carts, household carts, shopping carts, and baby carriages are known. None, however, are known to have mobility with wheels in working relationship to a stair climber, a pivotal handle and a cover on a cart basket for universal household, shopping, laundry and infant care in a manner taught by this invention.

SUMMARY OF THE INVENTION

Objects of patentable novelty and utility taught by this invention are to provide a household and shopping laundry cart which can:

carry household items up and down stairways;

carry laundry to-and-from laundry facilities and clothes lines;

carry items to-and-from vehicles;

protect infants and items being carried from falling out when ascending and descending stairways and other inclines;

protect infants and items being carried from damage by weather and objects;

be made safe from tipping due to infant movement and heights of loads carried;

be used for shopping;

be adjusted to differing heights of individuals;

be adjusted to differing heights of use conditions;

be trailered plurally for shopping and optionally for infant carriage;

be stacked telescopically for space-saving storage; and be made economical and long-lasting for household economy.

This invention accomplishes these and other objectives with a household and shopping laundry cart having a cart basket in a horizontal attitude with two wheels that are positioned on sides aft of a linear center. A handle is pivotal vertically on a front-top edge. A stair-climber bottom is inclined from a front of the wheels to a front-end support proximate a front-bottom edge of the basket. A flexible cover is extendable from a first top side to a second top side. Side walls of the basket are tapered inwardly from-top-to-bottom for telescopic storage of a plurality of the household and shopping laundry cart.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

A description of the preferred embodiment of this invention follows a list of numbered terms which designate its features with the same numbers on the drawings and in parentheses throughout the description and throughout the patent claims.

1. Cart basket
2. First-side wall
3. Second-side wall
4. Front-end wall
5. Aft-end wall
6. Bottom
7. First-side wheel
8. Second-side wheel
9. Axles
10. Tow handle
11. Tow hitch
12. Handle border
13. Basket cover
14. Stair-climber incline
15. Front support
16. Rough-terrain wheels
17. Wheel wells
18. Smooth-terrain wheels
19. Resilient wheel suspension
20. First bar spring
21. First-wheel axle
22. Joining axle
23. Second bar spring
24. Second-wheel axle
25. Climber-slide pad
26. U-rod handle 27. First handle rod
28. Second handle rod
29. U-handle
30. Adjustable-length handle
31. First handle base
32. Second handle base
33. Adjustable-length rod
34. Rod handle
35. External member
36. Internal member
37. Set screw
38. Set-screw aperture
39. Set-screw indents
40. Cam-lock prong
41. Cam-lock nut
42. Internal taper
43. External threads
44. Prong indents
45. Rounded handle border
46. Cover hook
47. Rigid support
48. Pivotal support
49. Forward-slant stop
50. Flexible cover
51. Rod end
52. Roll rod
53. First top side
54. Handle end
55. End stiffener
56. Second top side
57. Roll base
58. Roll spring
59. Roll stop
60. Stop lock
61. Stop handle
62. Lock gear
63. Cover handle
64. Arcuate-handle border
65. Prong latches Referring to FIGS. 1-12, a household and shopping laundry cart has a cart basket (1) with a first-side wall (2), a second-side wall (3), a front-end wall (4), an aft-end wall (5) and a bottom (6). The first-side wall (2), the second-side wall (3), the front-end wall (4), and the aft-end wall (5) are preferably angled predeterminedly from the bottom (6) outwardly to top edges thereof for a basket entry having a larger area than the bottom (6).

At least one first-side wheel (7) is oppositely disposed from at least one second-side wheel (8) predeterminedly aft of a center of the cart basket (1). The first-side wheel (7) and the second-side wheel (8) are rotational on axles (9) which are positioned predeterminedly proximate the bottom (6).

A tow handle (10) is pivotal vertically on a tow hitch (11) predeterminedly proximate the front-end wall (4).

Figure 8:
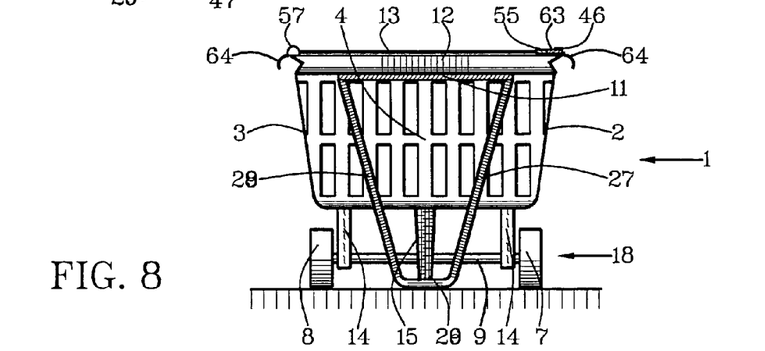
FIG. 8 is a front-end view of the FIG. 7 illustration in a covered mode.

A handle border (12) is provided proximate tops of the first-side wall (2), the second-side wall (3), the front-end wall (4), and the aft-end wall (5) predeterminedly. The handle border (12) is preferably a rounded handle border (45) at sections thereof where finger apertures can be provided in the first-side wall (2), the second-side wall (3), the front-end wall (4), and the aft-end wall (5). Predetermined portions of the handle border (12) can include arcuate-handle borders (64) as shown in FIG. 8.

A basket cover (13) is positioned predeterminedly over the basket entry intermediate tops of the first-side wall (2) and the second-side wall (3).

At least one stair-climber incline (14) is extended slantingly downward and rearward from intermediate a front of the bottom (6) and the axles (9) to beneath an axis of the axles (9) predeterminedly.

At least one front support (15) is extended downwardly from proximate the front of the bottom (6) for cooperating with the first-side wheel (7) and the second-side wheel (8) in supporting the cart basket (1) in a predeterminedly horizontal orientation when the household and shopping laundry cart is on a horizontal surface.

The cart basket (1) can include a laundry basket articulated to contain a class of items that include a predetermined washer load of laundry.

The cart basket (1) can include a utility basket articulated to contain a predetermined load of a class of items that includes shopping articles, household items and an infant selectively.

The first-side wall (2), the second-side wall (3), the front-end wall (4), and the aft-end wall (5) can be made of plastic material with predetermined apertures for air circulation and for minimizing weight per desired strength of the cart basket (1).

The first-side wheel (7) and the second-side wheel (8) can include rough-terrain wheels (16) having predeterminedly large diameters which are rotational on axles (9) which are positioned predeterminedly proximate a bottom surface of the bottom (6).

The household and shopping laundry cart can include wheel wells (17) which are articulated for receiving top portions of the rough-terrain wheels (16) predeterminedly proximate the first-side wall (2) and the second-side wall (3).

The stair-climber incline (14) is extended slantingly downward and rearward from intermediate a front of the bottom (6) and the axles (9) and intermediate proximate insides of the rough-terrain wheels (16) to beneath axes of the axles (9) for engaging edges of stairs predeterminedly beneath the axes of the axles (9) and in front of the rough-terrain wheels (16) for ascending and descending stairs. The first-side wheel (7) and the second-side wheel (8) can include smooth-terrain wheels (18) which have predeterminedly small diameters and are positioned for rotation predeterminedly below a bottom surface of the bottom (6).

Figure 7:
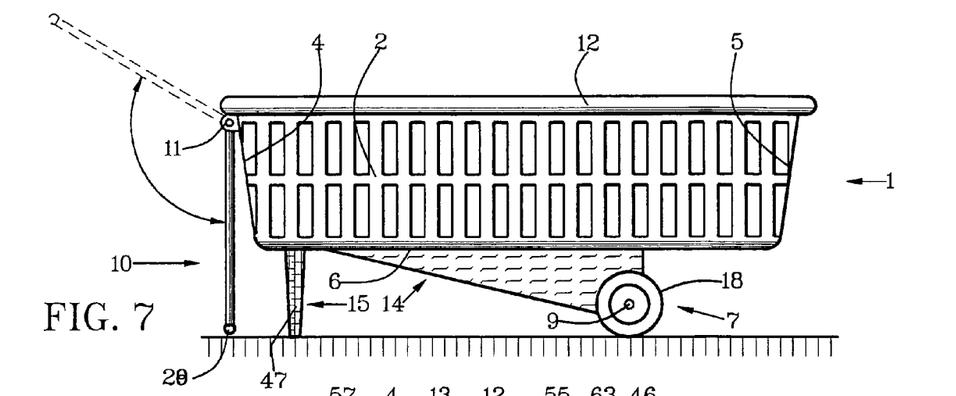
FIG. 7 is a side elevation view of the household and shopping laundry cart having smooth-terrain wheels, a rigid front-end support and a U-rod handle.
Figure 9:
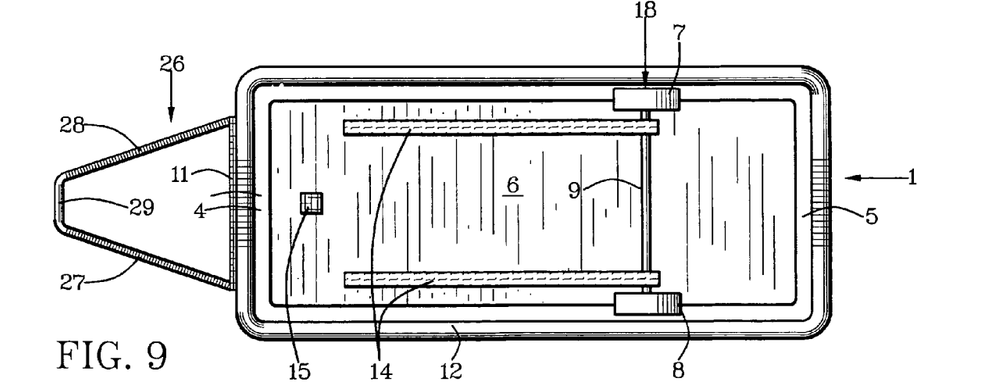
FIG. 9 is a bottom view of the FIG. 7 illustration.

The stair-climber incline (14) can include a pair of two stair-climber inclines (14) extended slantingly downward and rearward from intermediate a front of the bottom (6) and the axles (9) and intermediate proximate insides of the smooth-terrain wheels (18) to beneath axes of the axles (9) for engaging edges of stairs predeterminedly beneath the axes of the axles (9) and in front of the smooth-terrain wheels (18) for ascending and descending stairs.

Referring to FIGS. 10-15, the household and shopping laundry cart can include resilient wheel suspension (19) intermediate the cart basket (1) and the axles (9). The resilient wheel suspension (19) can include a first bar spring (20) extended slantingly downward and rearward from intermediate a front of a first side of the bottom (6) and the axles (9) to beneath the axes of the axles (9) for attachment of a first-wheel axle (21) of the first-side wheel (7). Additionally, the resilient wheel suspension (19) can include a second bar spring (23) extended slantingly downward and rearward from intermediate a front of a second side of the bottom (6) and the axles (9) to beneath the axes of the axles (9) for attachment of a second-wheel axle (24) of the second-side wheel (8). The first-side wheel (7) and the second-side wheel (8) can include the smooth-terrain wheels (18).

Figure 10:
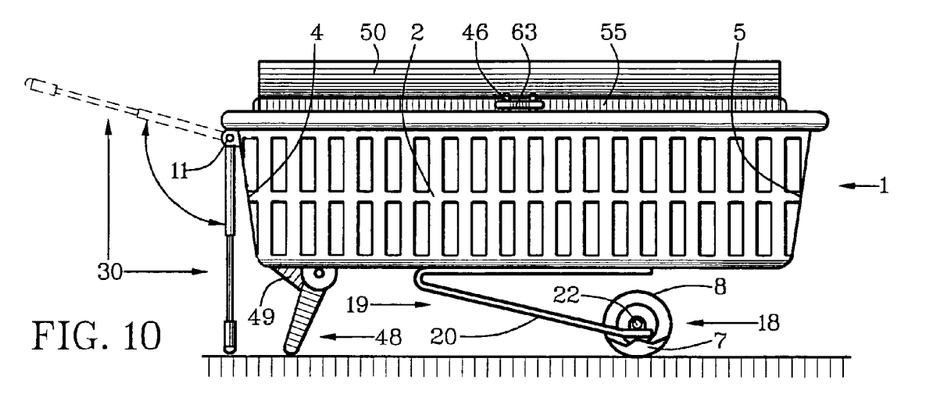
FIG. 10 is a side elevation view of the household and shopping laundry cart having smooth-terrain wheels, resilient wheel suspension, a pivotal front-end support and an adjustable-length handle.
Figure 11:
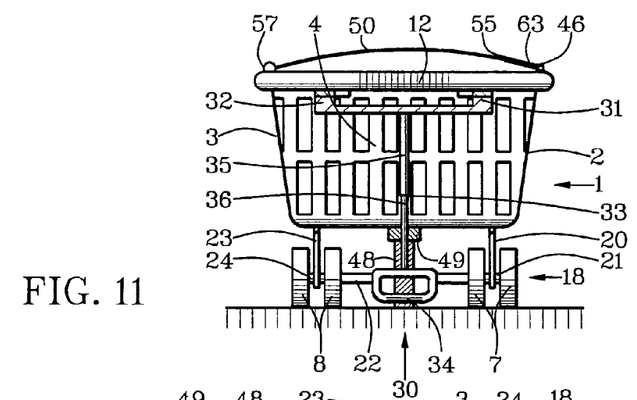
FIG. 11 is a front-end view of the FIG. 10 illustration in a covered mode.
Figure 12:
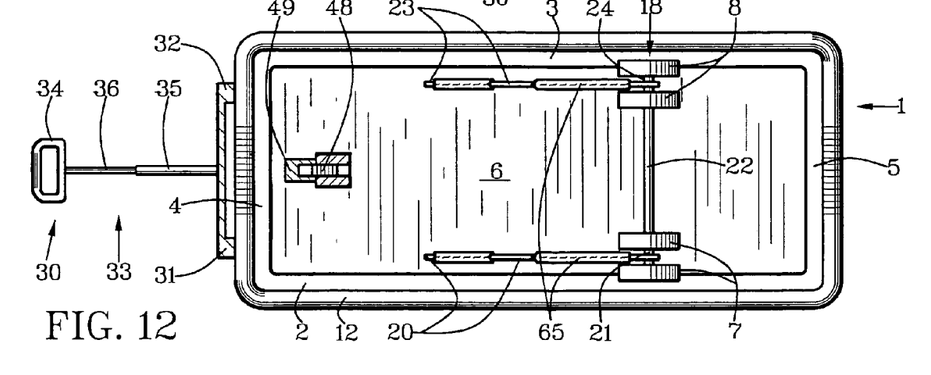
FIG. 12 is a bottom view of the FIG. 10 illustration.

The first bar spring (20) and the second bar spring (23) can be articulated to include combinatorially a double-bar stair-climber incline. The first bar spring (20) can include a first-wheel axle (21) that is orthogonal to the first bar spring (20). The second bar spring (23) can include a second-wheel axle (24) that is orthogonal to the second bar spring (23).

The smooth-terrain wheels (18) can be single or tandem. Either can be joined by a joining axle (22) intermediate the first-wheel axle (21) and the second-wheel axle (24).

Figure 1:
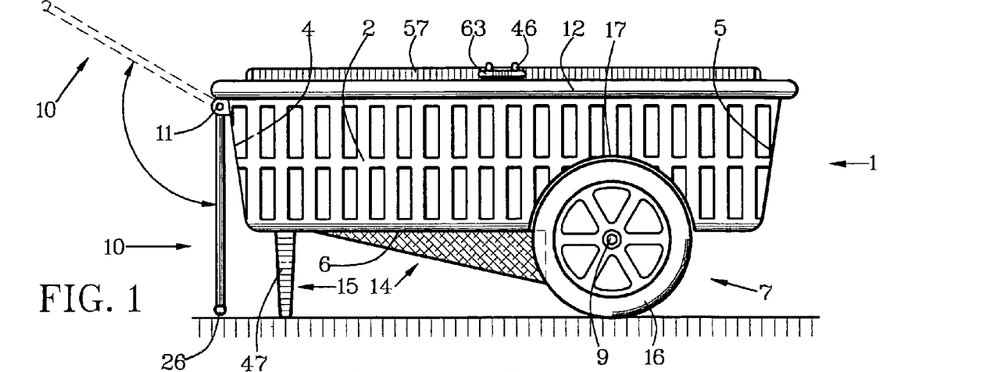
FIG. 1 is a side elevation view of the household and shopping laundry cart having rough-terrain wheels, a rigid front-end support and a U-rod handle.
Figure 2:
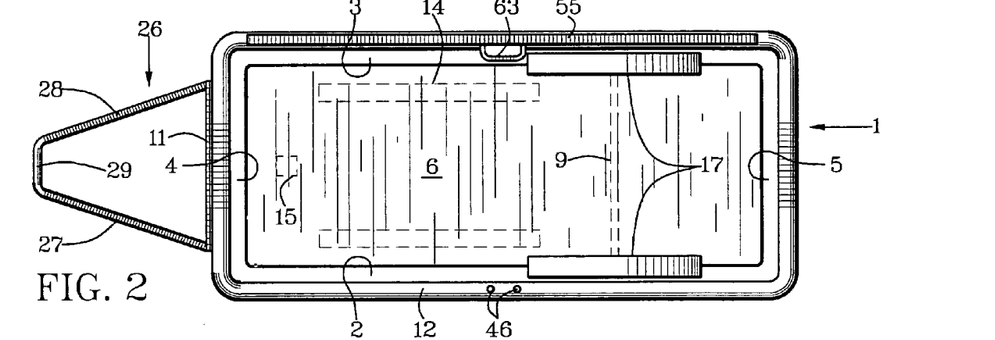
FIG. 2 is a top view of the FIG. 1 illustration in an uncovered mode.
Figure 3:
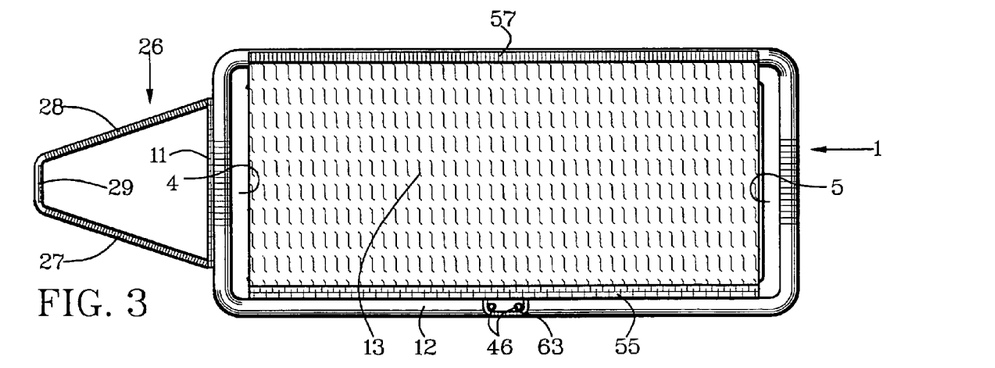
FIG. 3 is the FIG. 2 illustration in a covered mode with a single-strand basket cover.
Figure 4:
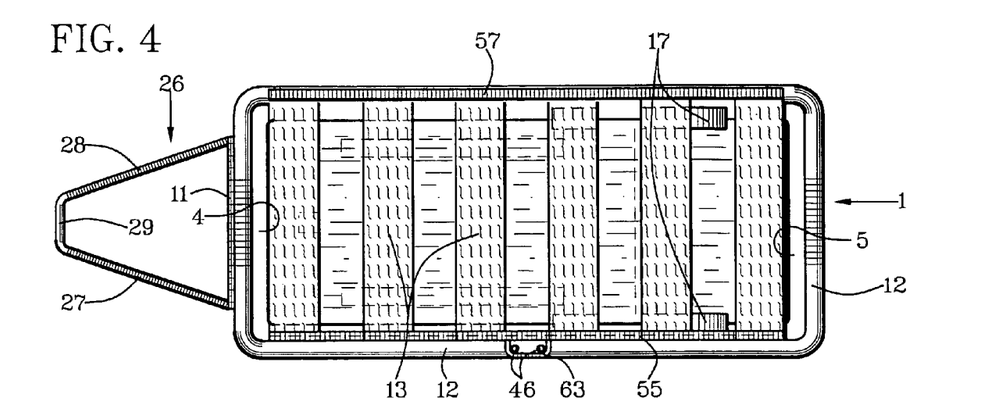
FIG. 4 is the FIG. 3 illustration in a covered mode with a multiple-strand basket cover.
Figure 5:
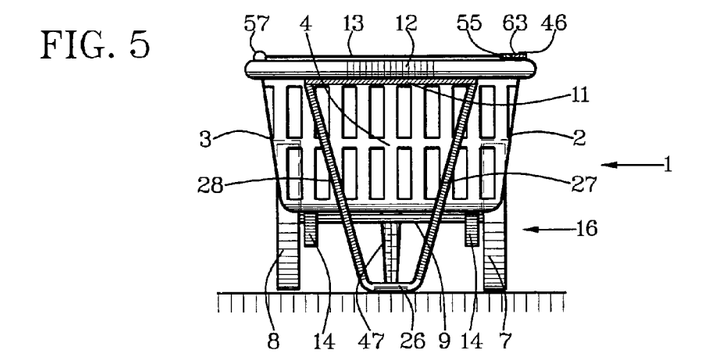
FIG. 5 is a front-end view of the FIG. 1 illustration in a covered mode.
Figure 6:
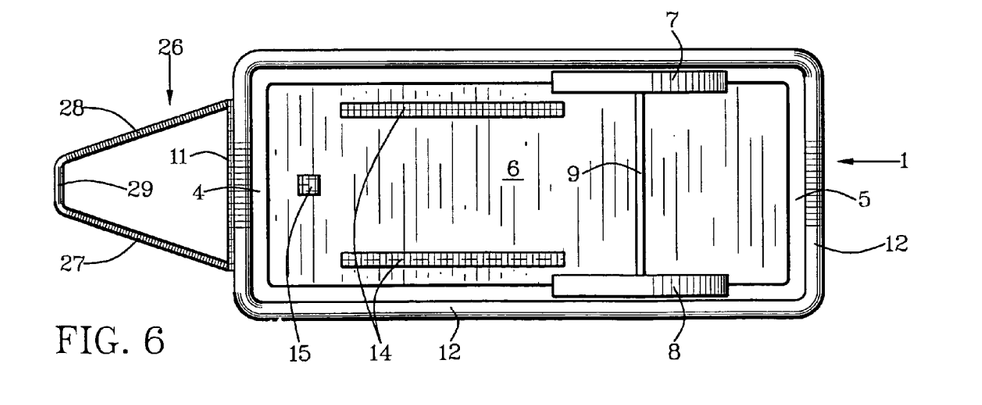
FIG. 6 is a bottom view of the FIG. 1 illustration.

The tow handle (10) can include a U-rod handle (26) having a first handle rod (27) pivotal vertically on a first side of a top portion of the front-end wall (4) and having a second handle rod (28) pivotal vertically on a second side of the top portion of the front-end wall (4). The first handle rod (27) and the second handle rod (28) are joined at obtuse angles to a U-handle (29).

Referring to FIGS. 1-15, the tow handle (10) can include an adjustable-length handle (30) having a first handle base (31) pivotal vertically proximate the first side of the top portion of the front-end wall (4) and having a second handle base (32) pivotal vertically proximate a second side of the top portion of the front-end wall (4). The first handle base (31) and the second handle base (32) are joined to an adjustable-length rod (33) having a rod handle (34) proximate a handle end.

Figures 13, 14:
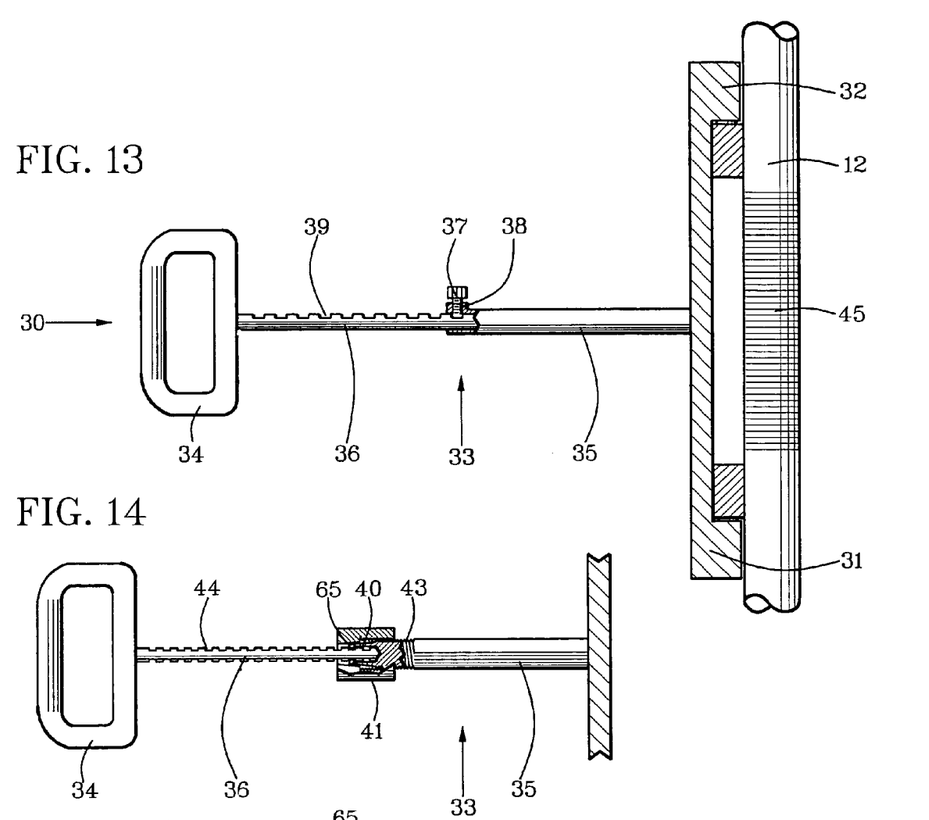
FIG. 13 is a partially cutaway side view of a length-adjustable handle with an adjustable-length rod that is length-fixable with a set screw.
FIG. 14 is a partially cutaway side view of a length-adjustable handle with an adjustable-length rod that is length-fixable with a cam-lock prong and a cam-lock nut.

The adjustable-length rod (33) can be telescopically adjustable with at least one external member (35) articulated for receiving at least one internal member (36) telescopically. The adjustable-length rod (33) can be length-lockable and rotation-lockable with a set screw (37) that is screwed into a set-screw aperture (38) that is articulated for lock-forcing engagement of the external member (35) and the internal member (36) as shown in FIG. 13. A plurality of set-screw indents (39) can be positioned consecutively on the internal member (36) for receiving an end of the set screw (37).

Figure 15:
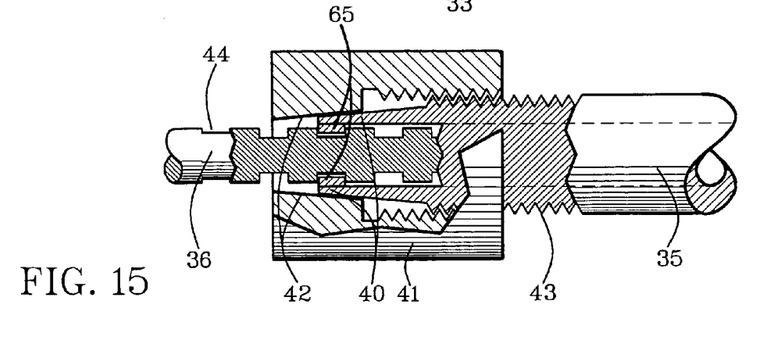
FIG. 15 is an enlargement of the view of the cam-lock prong and cam-lock nut of the FIG. 14 illustration.

As shown in FIGS. 14-15, the adjustable-length rod (33) can be length-lockable and rotation-lockable with at least one cam-lock prong (40) on the external member (35) being engaged forcibly in contact with and disengaged from forcible contact with an external surface of the internal member (36) with an internally threaded cam-lock nut (41) having an internal taper (42) in tapered contact with the cam-lock prong (40) for being screwed increasingly and decreasingly onto external threads (43) on the external member (35) selectively. A plurality of prong indents (44) can be positioned consecutively on the internal member (36) for receiving optional prong latches (65) on the cam-lock prong (40).

The cam-lock prong(s) (40) is (are) tensioned with radially outward spring pressure for allowing disengagement with an external periphery of the internal member (36) and for disengaging the prong latches (65) with the prong indents (44) when the cam-lock nut (41) is screwed on the external threads (43) to an unlocked mode towards the rod handle (34) and the internal taper (42) is disengaged from the cam-lock prongs (40).

The handle border (12) can include a rounded handle border (45) that is articulated for being hand-grasped by users having a predetermined range of sizes of hands.

The front support (15) can include a rigid support (47) as shown in FIGS. 1-2 and 5-9.

Optionally, as shown in FIGS. 10 and 12, the front support (15) can include a pivotal support (48) having predetermined forward pivot to a forward-slant stop (49) and rearward pivot to horizontality. The pivotal support (48) is preferably spring-biased forward to abut the forward-slant stop (49).

Figure 16:
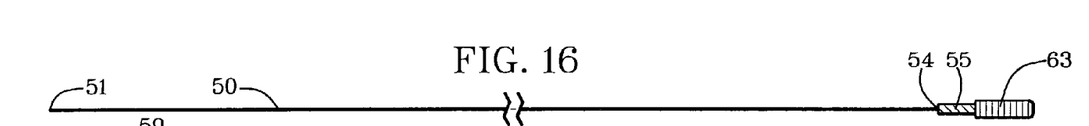
FIG. 16 is a partially cutaway side view of a basket cover with a cover handle.
Figure 17:
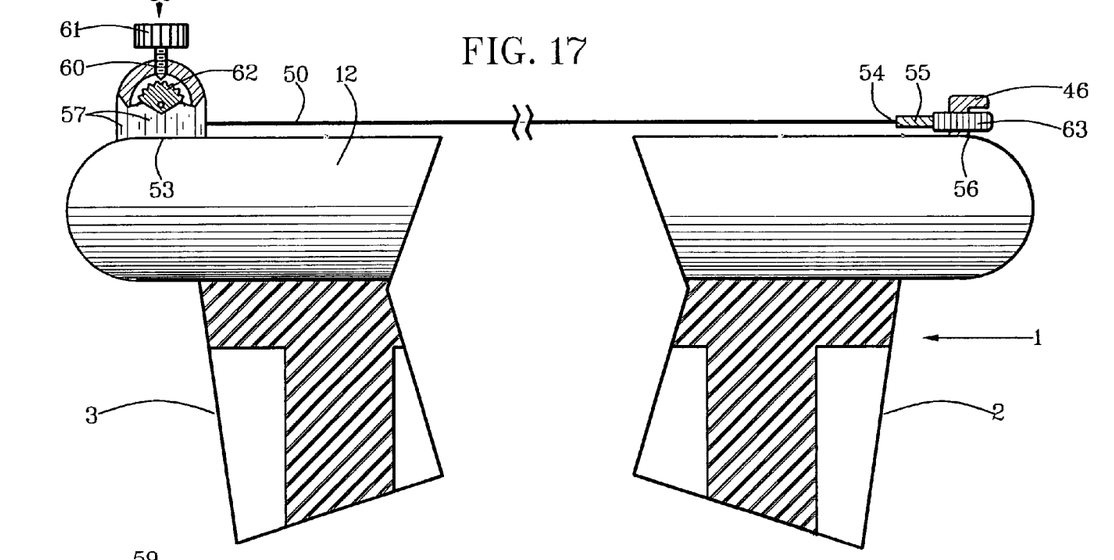
FIG. 17 is a partially cutaway side view of a top portion of the cart basket.
Figure 18:
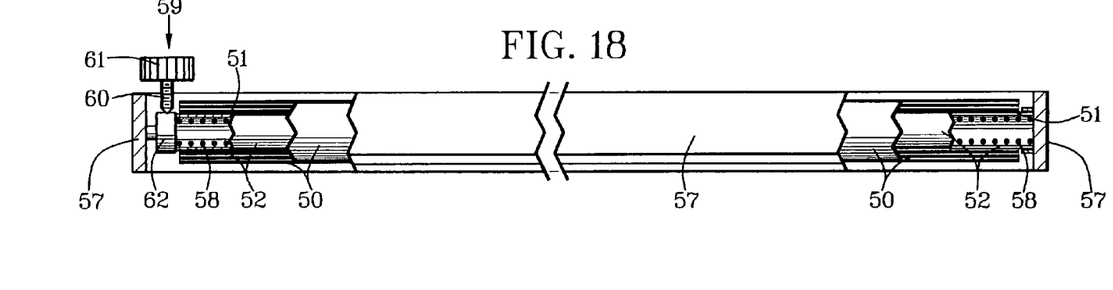
FIG. 18 is a partially cutaway view of a roll base with a roll rod on which a flexible cover is rolled and having a roll spring with roll gear and roll stop.

Referring to FIGS. 16-18, the basket cover (13) can include a flexible cover (50) having a rod end (51) attached to a roll rod (52). The roll rod (52) is attached rotationally to a first top side (53) of the cart basket (1). The flexible cover (50) includes a handle end (54) with an end stiffener (55) that is attachable to a second top side (56) of the cart basket (1) for covering the cart basket (1) and desired contents thereof with a length of the flexible cover (50) that is unrolled from the roll rod (52) and positioned intermediate the first-top side (53) and the second top side (56) selectively.

The basket cover (13) can include a roll base (57) attachable to the first top side (53) and a roll spring (58) attached to the roll base (57) to transmit rotational roll-on tension to the roll rod (52) for rolling the flexible cover (50) onto the roll rod (52). The roll spring (58) can include a coil-torsion spring as shown linearly in the roll rod (52). Optionally, the roll spring (58) can include a clock spring positioned proximate an end of the roll rod (52).

A roll stop (59) can be positioned on the roll base (57) and articulated for lock-stopping rotation of the roll rod (52) and thereby preventing rolling of the flexible cover (50) onto and off from the roll rod (52) selectively.

As shown in FIGS. 17-18, the roll stop (59) can include a stop lock (60) having a stop handle (61) articulated for engagement and disengagement of the stop lock (60) with a lock gear (62) on the roll rod (52) selectively. Also, the stop lock (60) can include a set screw having a tip that can be screwed into and out of the lock gear (62) on the roll rod (52).

As shown in FIGS. 1, 3-5, 8 and 16-17, the end stiffener (55) can include at least one cover handle (63) and the second top side (56) can include at least one cover hook (46).

A new and useful household and shopping laundry cart having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A household and shopping laundry cart comprising:
   a cart basket (1) having a first-side wall (2), a second-side wall (3), a front-end wall (4), an aft-end wall (5) and a bottom (6);
   the first-side wall (2), the second-side wall (3), the front-end wall (4), and the aft-end wall (5) being angled predeterminedly from the bottom (6) outwardly to top edges thereof for a basket entry having a larger area than the bottom (6);
   at least one first-side wheel (7) oppositely disposed from at least one second-side wheel (8) predeterminedly aft of a center of the cart basket (1);
   the first-side wheel (7) and the second-side wheel (8) being rotational on axles (9) which are positioned predeterminedly proximate the bottom (6);
   a tow handle (10) pivotal vertically on a tow hitch (11) predeterminedly proximate the front-end wall (4);
   a handle border (12) proximate tops of the first-side wall (2), the second-side wall (3), the front-end wall (4), and the aft-end wall (5) predeterminedly;
   the handle border (12) including a rounded handle border (45) articulated for being hand-grasped by users having a predetermined range of sizes of hands;
   a basket cover (13) positioned predeterminedly over the basket entry intermediate tops of the first-side wall (2) and the second-side wall (3);
   the basket cover (13) includes a flexible cover (50) having a rod end (51) attached to a roll rod (52);

the roll rod (52) is attached rotationally to a first top side (53) of the cart basket (1);

the flexible cover (50) includes a handle end (54) with an end stiffener (55) that is attachable to a second top side (56) of the cart basket (1) for covering the cart basket (1) and desired contents thereof with a length of the flexible cover (50) that is unrolled from the roll rod (52) and positioned intermediate the first-top side (53) and the second top side (56) selectively;

at least one stair-climber incline (14) extended slantingly downward and rearward from intermediate a front of the bottom (6) and the axles (9) to beneath an axis of the axles (9) predeterminedly;

at least one front support (15) extended downwardly from proximate the front of the bottom (6) for cooperating with the first-side wheel (7) and the second-side wheel (8) in supporting the cart basket (1) in a predeterminedly horizontal orientation when the household and shopping laundry cart is on a horizontal surface;

the front support (15) includes a pivotal support (48) having predetermined forward pivot to a forward-slant stop (49) and rearward pivot to horizontality; and the cart basket (1) includes a laundry basket articulated to contain a class of items that include a predetermined washer load of laundry.

2. The household and shopping laundry cart of claim 1 wherein:

the laundry basket (1) includes a utility basket articulated to contain a predetermined load of a class of items that includes shopping articles, household items and an infant.

3. The household and shopping laundry cart of claim 1 wherein:

the first-side wheel (7) and the second-side wheel (8) include rough-terrain wheels (16) having predeterminedly large diameters which are rotational on axles (9) which are positioned predeterminedly proximate a bottom surface of the bottom (6).

4. The household and shopping laundry cart of claim 1 wherein:

the first-side wheel (7) and the second-side wheel (8) include smooth-terrain wheels (18) having predeterminedly small diameters and are positioned for rotation predeterminedly below a bottom surface of the bottom (6).

5. The household and shopping laundry cart of claim 1 and further comprising:

resilient suspension (19) intermediate the cart basket (1) and the axles (9);

the resilient wheel suspension (19) includes a first bar spring (20) extended slantingly downward and rearward from intermediate a front of a first side of the bottom (6) and the axles (9) to beneath the axes of the axles (9) for attachment of a first axle (21) of the first-side wheel (7); and the resilient wheel suspension (19) includes a second bar spring (23) extended slantingly downward and rearward from intermediate a front of a second side of the bottom (6) and the axles (9) to beneath the axes of the axles (9) for attachment of a second axle (24) of the second-side wheel (8).

6. The household and shopping laundry cart of claim 5 wherein:

the first-side wheel (7) and the second-side wheel (8) include the smooth-terrain wheels (18).

7. The household and shopping laundry cart of claim 5 wherein:

the first bar spring (20) and the second bar spring (23) are articulated to include in combination a double-bar stair-climber incline (26);

the first bar spring (20) includes a first-wheel axle (21) that is orthogonal to the first bar spring (20); and the second bar spring (23) includes a second-wheel axle (24) that is orthogonal to the second bar spring (23).

8. The household and shopping laundry cart of claim 1 wherein:

the tow handle (10) includes a U-rod handle (26) having a first handle rod (27) pivotal vertically on a first side of a top portion of the front-end wall (4) and having a second handle rod (28) pivotal vertically on a second side of the top portion of the front-end wall (4); and the first handle rod (27) and the second handle rod (28) are joined at obtuse angles to a U-handle (29).

9. The household and shopping laundry cart of claim 1 wherein:

the tow handle (10) includes an adjustable-length handle (30) having a first handle base (31) pivotal vertically proximate the first side of the top portion of the front-end wall (4) and having a second handle (32) pivotal vertically proximate a second side of the top portion of the front-end wall (4);

the first handle base (31) and the second handle base (32) are joined to an adjustable-length rod (33) having a rod handle (34) proximate a handle end; and the adjustable-length rod (33) is telescopically adjustable with at least one external member (35) articulated for receiving at least one internal member (36) telescopically.

10. The household and shopping laundry cart of claim 1 wherein:

the front support (15) includes a pivotal support (48) having predetermined forward pivot to a forward-slant stop (49).

11. The household and shopping laundry cart of claim 1 wherein:

the basket cover (13) includes a roll base (57) attachable to the first top side (53); and a roll spring (58) is attached to the roll base (57) and articulated to transmit rotational roll-on tension to the roll rod (52) for rolling the flexible cover (50) onto the roll rod (52).

12. The household and shopping laundry cart of claim 11 and further comprising:

a roll stop (59) positioned on the roll base (57) and articulated for lock-stopping rotation of the roll rod (52) and thereby preventing of rolling of the flexible cover (54) onto and off from the roll rod (52) selectively.

13. The household and shopping cart of claim 12 wherein:

the roll stop (59) includes a stop lock (60) having a stop handle (61) articulated for engagement and disengagement of the stop lock (60) with a lock gear (62) on the roll rod (52) selectively.

14. The household and shopping cart of claim 13 wherein:

the end stiffener (55) includes at least one cover handle (63); and the second top side (56) includes at least one cover hook (46).

15. The household and shopping laundry cart of claim 1 wherein:

the basket cover (13) includes the at least one cover handle (63) and the cart basket (1) includes the at least one cover hook (46).

16. The household and shopping laundry cart of claim 1 wherein:

the first-side wall (2), the second-side wall (3), the front-end wall (4), and the aft-end wall (5) of the laundry basket are made of plastic material with predetermined apertures for air circulation and for minimizing weight per appropriate strength of the laundry basket.

* * * * *